United States Patent [19]

Kim

[11] Patent Number: 5,498,683

[45] Date of Patent: Mar. 12, 1996

[54] POLYMER CONCRETE COMPOSITIONS AND METHOD OF USE

[76] Inventor: Chung S. Kim, 1955 Santa Maria Way, Sacramento, Calif. 95864

[21] Appl. No.: 210,057

[22] Filed: Mar. 15, 1994

[51] Int. Cl.$^6$ .......................... C08F 20/26; C08F 265/04
[52] U.S. Cl. .......................... 526/320; 526/329.2; 524/5; 524/8; 525/303; 525/304; 525/327.3; 523/526
[58] Field of Search .................. 524/8, 5; 525/303, 525/327.3, 304; 526/320, 329.2; 523/526

[56] References Cited

U.S. PATENT DOCUMENTS

| | | | |
|---|---|---|---|
| 3,836,600 | 9/1974 | Brewbaker et al. | 525/89 |
| 4,172,102 | 10/1979 | Hoene et al. | 525/74 |
| 4,460,625 | 8/1984 | Emmons et al. | 427/136 |
| 4,500,674 | 2/1985 | Fontana et al. | 524/650 |
| 4,722,976 | 2/1988 | Ceska | 525/301 |
| 4,874,675 | 10/1989 | Ceska | 428/521 |
| 5,082,878 | 1/1992 | Bansleben et al. | 523/503 |
| 5,157,072 | 10/1992 | Hense et al. | 524/553 |
| 5,212,252 | 5/1993 | Aoki et al. | 525/327.3 |
| 5,256,723 | 10/1993 | Hense et al. | 524/553 |
| 5,326,827 | 7/1994 | Aoki et al. | 525/327.3 |

*Primary Examiner*—Tae H. Yoon

[57] ABSTRACT

Binder premix or primer compositions comprise (a) vinyl esters and/or unsaturated polyesters containing characteristic linkages, —COO—CH$_2$—CHOH—CH$_2$O—, (b) monofunctional and/or polyfunctional vinyl monomers and/or monofunctional and/or polyfunctional resins, and (c) monofunctional and polyfunctional vinyl monomers and/or monofunctional and/or polyfunctional resins which have very high group molar attraction constants. The primer or binder premix is utilized in the repair of a bridge, highway, roadway, airport runway, parking structure, or patio and similar type structures.

2 Claims, No Drawings

POLYMER CONCRETE COMPOSITIONS AND METHOD OF USE

BACKGROUND OF THE INVENTION

1. Field of the Invention

A primer or binder premix of polymer concrete is disclosed that has a solubility parameter which allows high affinity toward other moist polymer concretes and polar substrates during mixing and casting, but becomes virtually insoluble in water after the cure process is complete (after the polymerization). The subject primer or binder premix is utilized in the repair of a bridge, highway, roadway, airport runway, parking structure, patio or like type structure.

2. Description of the Background Art

There are four basic polymer concretes (PCs) which have been used and/or tested extensively for rehabilitation of a common building material known as Portland cement concrete (PCC). Examples are repairs of parking structures, bridges, highways, airport runways, industrial floors, and the like. Usually, the repair work should take a minimum amount of time, preferably less than five hours. The binders for the four basic PCs are epoxies, polyurethanes, methacrylates, and unsaturated polyesters. Each of them has advantages and disadvantages. Epoxies have advantages of being tougher, having low volume shrinkage, and superior bond adhesions. However, they tend to have poor cure characteristics (difficult to control pot-life and curetime over a wide application temperature range). Polyurethanes have many of the good characteristic of epoxies, but also have a poor cure behavior that is similar to epoxies, and have marginal bonding characteristics. Both resins cure through a step-polymerization mechanism, and consequently the overall cure process is difficult to control.

Given the above facts, one common application procedure is by a multilayer overlay method, i.e. applying the resin first and then broadcasting the aggregates over the wet binder, and repeating the process three to five times. Another application method is to prepack the aggregates first and then apply the resin over the aggregates. These methods have the disadvantage of taking a prolonged period of repair work or giving nonuniform compositions of PCs.

Since the other two basic binders, methacrylates and unsaturated polyesters, undergo a cure process by a free-radical chain mechanism, their pot-life and cure processes can be controlled more readily. With these systems a polymer concrete slurry (e.g. binder and aggregates are premixed into a slurry) can be applied in a single step. Methyl methacrylate (MMA) has been utilized in such a slurry. MMA, with its very low viscosity, has a strong advantage of being able to penetrate into fine cracks and pores; however, its high volatility and flammability are strong disadvantages. Recently high molecular weight methacrylates (HMWMs) have been used in place of MMA in order to improve primarily volatility and safety characteristics. Although there are a variety of commercial methacrylates available, their bonding characteristics are marginal (poor bonding to moist surfaces), and some are brittle or expensive.

Unsaturated polyesters have been widely used for overlay work for bridges and roads, but they have poor bonding characteristics to PCC and aggregates, although incorporation of silane coupling agents improves the bonding to a degree. Many overlay works with unsaturated polyesters use HMWM as a primer.

No data on vinyl esters are available for repair work of outdoor concrete structures such as for bridges, highways, and the like, but vinyl esters have been used as chemical resistant overlays for industrial floors (R. A. Schoenberger, et. al. *ICPIC Working Papers, Sept.* 24–27, 1991).

In general, the currently known PC systems which undergo cure processes by free-radical chain reactions, have either poor or borderline bonding characteristics, especially when the surfaces are moist. Very rigorous drying and good surface preparation of the substrates to be repaired, and aggregates having very low moisture content have been emphasized for the acceptable repair. Common failures of repairs with unsaturated polyester PCs and HMWM PCs occur at the interfacial bonding. The failures are believed to be mainly due to shear stresses that are caused by cure shrinkage and the difference between the thermal expansion coefficient of two solid materials. There are volume shrinkage reducing agents available to minimize the shrinkage during cure. However, debonding can be caused by other factors such as moisture, freezing of water filled PCC, acid rain, oil, heavy wheel loads, deicing salts, tracked-on abrasives such as rocks, snowplow blades, vapor pressure from the substrate, live load shear stresses caused by turning, braking, or accelerating vehicles, impact stresses caused by roughness in the riding surface, and similar conditions. Therefore, it is desirable to develop PCs which give good bonding and have good strain energy, impact strength, and chemical resistance.

SUMMARY OF THE INVENTION

An object of the present invention is to produce polymeric concrete compositions capable of bonding together or with moist and very polar substrates and cure by a free-radical polymerization process.

Another object of the present invention is to provide polymeric concrete compositions having desirable bonding characteristics, suitable strain energy properties, acceptable impact strengths, and appropriate chemical resistance.

A further object of the present invention is to disclosed a polymeric concrete compositions that are virtually impermeable to aqueous media after they cure.

Generally, the subject invention comprises a primer or binder premix of PC that has a solubility parameter which allows a high affinity towards moist PCC and polar substrates (usually solids to be repaired, protected, treated, or the like by the subject compositions) during mixing and casting, but becomes virtually insoluble in water after the cure process is complete (after the polymerization). Furthermore, PC compositions of this invention are stronger, more impact resistant, and more chemical resistant than currently available unsaturated polyester PCs.

One significant advantage of the subject compositions is that moist and very polar substrates can be bonded effectively with the subject PC without rigorously drying the substrates and aggregates. Additionally, the resulting subject PC compositions protect rebars and PCC from aggressive chemicals and aqueous media because the PC compositions become virtually impermeable to aqueous media after they are cured.

Interfacial bond strengths for PCs of the subject invention with the repaired or treated solids are greater than the cohesive strengths within the solids themselves, even though the substrate solids are initially moist. In other words, no interfacial failure was observed with our test samples, and this is evidence of bond strengths for PC to PCC being greater than cohesive strength within PCC, and those for PC to metal being greater than cohesive strength within PC.

Primer or binder premix of PC of the subject compositions contain vinyl esters and/or unsaturated polyesters having characteristic linkages, —COO—CH$_2$—CHOH—CH$_2$O—, and monofunctional and polyfunctional vinyl monomers and/or monofunctional and/or polyfunctional resins. However, some of the polyfunctional and monofunctional vinyl monomers and resins contain functional groups which have very high group molar attraction constants. Consequently, the resulting primer or binder premix has strong affinity towards water and polar mediums in general. The subject compositions are cured readily over a wide temperature range using free radical initiator(s) in the presence of metal catalyst(s) and/or tertiary amine(s). After the cure, the subject PC compositions of this invention exhibit superior strengths and greater chemical resistance than those of unsaturated polyester PCs and many HMWM PCs, but in addition, exhibit excellent bonding to PCC and metals even though the substrate solids are moist.

More specifically, the subject invention compositions comprise binder premix or primer compositions having (a) vinyl esters and/or unsaturated polyesters containing characteristic linkages, —COO—CH$_2$—CHOH—CH$_2$O—, (b) monofunctional and/or polyfunctional vinyl monomers and/or monofunctional and/or polyfunctional resins, and (c) monofunctional and/or polyfunctional vinyl monomers and/or monofunctional and/or polyfunctional resins which have very high group molar attraction constants.

Other objects, advantages, and novel features of the present invention will become apparent from the detailed description that follows, when considered in conjunction with the associated drawings.

DESCRIPTION OF THE PREFERRED EMBODIMENT

Binder premix or primer compositions of the subject invention consist of three prime component groups (a) vinyl esters and/or unsaturated polyesters containing characteristic, —COO—CH$_2$—CHOH—CH$_2$O—, linkages, (b) monofunctional and/or polyfunctional vinyl monomers and/or monofunctional and/or polyfunctional resins, and (c) monofunctional and/or polyfunctional vinyl monomers and/or monofunctional and/or polyfunctional resins which have very high group molar attraction constants (see below for specific examples). There are many different repair or usage applications and the specific composition of the components and concentrations are based on type of repair or usage. Types and relative amounts of components (a), (b) and (c), see above, are selected not only to create effective interfacial bonding to aggregates and to substrate solids, but also to develop PCs having desired stress-strain properties, viscosity, and other desirable characteristics Additionally, other ingredients, such as (d) silane coupling agents, (e) flexiblizing agents, (f) processing aids, (g) shrinkage reducing agents, and (h) UV stabilizers are also incorporated into the subject compositions as needed in any particular desired repair or usage situation. Usually, the binder premix is cured with free-radical initiator(s) catalyzed by metal salt(s) and/or tertiary amine(s) over a wide temperature range (from about 4° C. to about 35° C.) over a desired cure time (from about one hour to about 24 hours). Typical catalysts and initiators that are utilized to polymerize the subject binder premix compositions into polymeric cement are described in U.S. Pat. No. : 4,460,625, column 5, line 64, to column 7, line 15, which is herein incorporated by reference. The pot-life of these resins can be controlled through manipulating types and amounts of initiators, free-radical traps, catalysts, chelating agents, and/or similar ingredients or conditions such as temperature, pressure, and the like. The composition of the binder premix is such that it has a strong affinity towards water and polar substrates, but becomes virtually insoluble (less than about 0.5% water absorption) after polymerization or cure.

Typically, the binder premix components are found in approximately the following ranges: (a) is about 10 to about 90 weight %, preferably, about 20 to about 60 weight %; (b) is about 10 to about 70 weight %, preferably, about 20 to about 60 weight %; (c) is about 0.1 to about 60 weight %, preferably, about one to about 50 weight %; (d) is about zero to about two weight %, preferably, about zero to about one weight %; (e) is about zero to about 50 weight %, preferably, about 10 to about 40 weight %; (f) is about zero to about two weight %, preferably, about zero to about one weight %; (g) is about zero to about 0.5 weight %; and (h) is about zero to about five weight percent.

Group (a) comprises one or more of vinyl esters and unsaturated polyesters containing characteristic linkages, —COO—CH$_2$—CHOH—CH$_2$O—. Usually, though not necessarily exclusively, the subject vinyl esters and unsaturated polyesters are synthesized from epoxides which contain more than one oxirane groups per molecule. Acceptable synthetic methods are described in U.S. Pat. No. : 3,836,600, col. 3, line 34, to col. 5, line 7, and in various previous patents which are cited in U.S. Pat. No. : 3,836,600, which are incorporated herein by reference. Examples are Bisphenol-A-fumarate polyesters and vinyl esters such as Bisphenol A and epoxy-novolac-based vinyl esters.

Group (b) comprises one or more of monofunctional and/or polyfunctional vinyl monomers and/or monofunctional and/or polyfunctional resins which include, but are not limited to, the monomers cited in U.S. Pat. No. : 3,836,600, column 5, which is incorporated herein by reference. Therefore, group (b) comprises a set of species produced from individual components or combinations of components selected from monofunctional vinyl monomers and resins and polyfunctional vinyl monomers and resins.

Group (c) comprises one or more of monofunctional and/or polyfunctional vinyl monomers and/or monofunctional and/or polyfunctional resins which contain functional groups having very high group molar attraction constants. Therefore, group (c) comprises a set of species produced from individual components or combinations of components selected from monofunctional vinyl monomers and resins and polyfunctional vinyl monomers and resins which contain functional groups having very high group molar attraction constants. The highly polar functional groups include, but not limited to, hydroxyl groups, thiol groups, cyano groups, amide groups, amino groups, sulfonic acid groups, carboxylic acid groups, phosphate groups, sulfone groups, sulfonate groups, and ether groups. Examples of group (c) components, for illustrative purposes only, are:

$$CH_2=CR-COO-(C_nH_{2n})-OH \qquad (I)$$

where R=H or CH$_3$ and n=2–10;

$$CH_2=CR—CO—(OCH_2CH_2)_n—O—CO—CR=CH_2 \quad (II)$$

where R=H or $CH_3$ and n=1–10;

$$CH_2=CR—COOH \quad (III)$$

where R=H or $CH_3$;

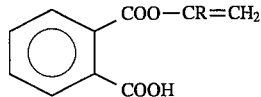

(IV)

where R=H or $CH_3$; and $$CH_2=CR—COO—CH_2—CHOH—CH_2—O—CO—CR=CH_2 \quad (v)$$

where R=H or $CH_3$.

Group (d) comprises silane coupling agents such as gamma-methacryloxypropyltrimethoxysilane (A-174) and equivalent materials.

Group (e) comprises flexiblizing agents which will allow more resiliency and flexibility of PCs. Often utilized are two types, (1) elastomers such as acylonitrile-butadiene (AN-BD) prepolymers or polyalkylene oxides and (2) acrylates and methacrylates having general structures of (VI):

$$CH_2=CR—COO—C_nH_{2n+1} \quad (VI)$$

where R=H or $CH_3$ and n=4–18. The acrylonitrile content in the AN-BD prepolymers are preferably about 10 to about 40 weight % and the molecular weights are in the range of about 2,000 to about 8,000. Polyalkylene oxides examples have a general structure (VII):

$$—(CH_2—CRH—O)_n— \quad (VII)$$

where R=H, $CH_3$, or $CH_2CH_3$, with molecular weight range of about 1,000 to about 5,000. These prepolymers can have terminal groups of acrylates or methacrylates, or can be incorporated into vinyl esters and unsaturated polyesters by synthetic procedures described in U.S. Pat. No. : 3,836,600, which is incorporated herein by reference.

Group (f) comprises processing aids such as SILWET L-77 or L- 7602 (from Union Carbide, 39 Old Ridgebury Road, Dansbury, Conn. 06817-0001) and those described in U.S. Pat. No. : 4,500,674, which is incorporated herein by reference.

Group (g) comprises volume shrinkage reducing agents such as poly (vinyl versarate-co-vinyl acetate) EX-37 (from W. R. Grace and described in U.S. Pat. No. : 5,082,878) and those described in U.S. Pat. Nos.: 5,256,723; 5,157,072; 4,874,675; 4,722,976; and 4,172,102, which are herein incorporated by reference.

Group (h) comprises UV stabilizers such as benzophenones, benzotriazoles, and those listed in the *Modern Plastics Encyclopedia*, p. 546–547 (1992), which is incorporated herein by reference.

Binder premixes are usually prepromoted with metal catalyst(s) and/or tertiary amines, and then mixed with free-radical initiator(s) immediately prior to application. Types and amounts of stabilizers, metal salts, tertiary amines, and/or initiators may be optimized to control the pot-life to be about 30 minutes to about 60 minutes and the cure time to be about 3 hours to about 10 hours over a wide application temperature range (about 4° C. to about 35° C.), although lesser and greater times and temperatures are contemplated by this disclosure.

As indicated above, types of catalysts and initiators commonly used are described in U.S. Pat. No. : 4,460,625, columns 4 to 7, however, a rapid and more complete cure is accomplished by top coating the PC with a wax solution or solution such as BYK-5740 (from BYK-Chemie, USA, 524 S. Cherry Street, Wallingford, Conn. 06492). These materials minimize the interference of the cure process by atmospheric oxygen.

Methods used for repair of PCC with these subject compositions materials are essentially the same as for HMWM or unsaturated polyester formulations. Three common methods are:

(1) Binder premix is prepromoted with catalysts, and the surface of substrates are well prepared. As soon as the initiator is added and mixed well into the binder premix, it is spread over the substrate surface. Immediately after the resin has been applied, the specified aggregate is broadcast to a slight excess over the resin. Any excess aggregate that is not embedded in the cured resin is removed after cure. Application of resin and broadcasting aggregate is repeated about three to five times.

(2) After the addition of initiator(s) to prepromoted binder premix, aggregates (about 60 to about 92 weight %) are mixed in. Typical aggregates are listed in U.S. Pat. No. : 4,460,625, column 5, lines 35 to 63, which is incorporated herein by reference. The resulting PC slurry is applied on well prepared surfaces to a desired thickness in one application. It is often desirable to have a primer application prior to applying the PC slurry.

(3) Well prepared substrates are prepacked with aggregates, and then the binder premix is applied over the aggregates.

Commonly used aggregates are individual compositions and combinations of quartz, silica flour, silica sand, basalt, aluminum oxide, fly ash, calcium carbonates, crushed rocks, gravels, and the like, including those noted above in U.S. Pat. No. : 4,460,625.

EXAMPLES

Four different formulations are used as primer or binder premix to obtain PC slurry. Formulation #1 is a standard preparation that is supplied by Aristech Chemical Corp. (600 grant Street, Pittsburgh, Pa. 15219-2704) under Code No.: C2062C. The weight percents indicated immediately below are approximations for the actual composition of the Aristech standard resin.

| Binder Premix or Primer Formulation #1 | |
|---|---|
| Approximate weight percent for prepromoted resin is: | |
| Unsaturated iso-polyester | 49.5% |
| Styrene | 49.5% |
| A-174 | 1.0% |

Since the above resin is already prepromoted with catalyst, only an initiator methylethylketone peroxide (MEKP), 0.12 g, is mixed into the above 10.0 g of resin immediately prior to application. Additionally, it is noted that Formulation #1 is one of the resins which meets the specifications of the Department of Highway, State of California (Caltrans)

for overlay materials for bridges and highways (as discussed by P. L. Glanz and R. Maggenti in "Bonded Polyester Concrete Overlays Used In California," proceedings of papers presented at the Structures Congress of 1993, vol. 2, pp. 1002–1007, April 1993).

Binder Premix or Primer Formulation #2

HMWM (RPM 2000) from Revolan Systems (1631 S. 10th Street, San Jose, Calif. 95112), San Jose, Calif., is prepromoted with Revolan's copper salt and cured with Revolan's cumene hydroperoxide using Revolan's recipe.

Binder Premix or Primer Formulation #3

Prepromoted resin composition by weight percent is:

| | |
|---|---|
| Bisphenol-A vinyl ester rubberized with 25% Acrylonitrile-butadiene elastomer | 54.7% |
| Styrene | 29.0% |
| Hydroxyethylmethacrylate | 9.9% |
| Diethyleneglycol dimethacrylate | 4.9% |
| A-174 | 0.5% |
| Cobalt octoate (6% metal) | 0.7% |
| Dimethylaniline | 0.3% |

For Formulation #3, methylethylketone peroxide (MEKP), 0.12 g, is mixed into 10.0 g of above resin immediately prior to application. The elastomer indicated in Formulation #3 above (and below in Formulation #4) is available as HYCAR 1300X13 from B.F. Goodrich, 9911 Brecksville Road, Brecksville, Ohio 44141.

Binder Premix or Primer Formulation #4

Prepromoted resin composition by weight percent is:

| | |
|---|---|
| Bisphenol-A vinyl ester rubberized with 25% Acrylonitrile-butadiene elastomer | 64.0% |
| Styrene | 34.5% |
| A-174 | 0.5% |
| Silwet (processing aid from Union Carbide) | 0.1% |
| Cobalt octoate (6% metal) | 0.7% |
| Dimethylaniline | 0.3% |

For Formulation #4, methylethylketone peroxide (MEKP), 0.12 g, is mixed into 10.0 g of above prepromoted resin immediately prior to application.

Binder properties are shown in Table I.

Pot-life of these binders can be readily controlled to about 30–60 minutes. Viscosity of primer and binder premix can be lowered by incorporating more monomers. It is desirable to have the glass transition temperature (Tg) to be greater than the upper limit of the service temperature (approximately 60° C.). Binder premix of the subject invention (Formulation #3) has higher Tg than formulation currently used, Formulation #1, by Caltrans. Furthermore, cured binder of the subject composition, Formulation #3, has less degrees of water and oil absorptions and less losses of mass during and after the 20 cycles of intermittent immersion in oil or water. Each cycle consists of heating the samples at about 57° C. followed by immersion in oil or water at room temperature for about 24 hours.

PC slurries are obtained by mixing the above binder premix formulations with aggregates (form Lonestar Corp., 6601 Koll Center Parkway, Pleasanton, Calif. 94566) in following weight ratios:

| | |
|---|---|
| Binder Premix | 8.0 |
| Lonestar #60 Sand | 12.0 |
| Lonestar #1/20 Sand | 13.00 |
| Lonestar #3 Sand | 15.0 |
| Lonestar B-39 pea gravel | 30.0. |

Surfaces of the substrates to be bonded are primed either with the same binder premix formulation as for PC or a different premix formulation, and the PC slurry is cast within about 30 minutes of priming.

Strength properties of PCs and their bond properties to dry and moist PCC, steel, and aluminum, are shown in Table II. The PCC is formulated with the following weight % values:

| | |
|---|---|
| Lonestar pea gravel B-39 | 45% |
| TPerkins PCC sand | 30% |
| Type II cement | 17.5% |
| Water | 7.5% |

In addition, 500 g of superplasticizer (WRDA-19 from W. R. Grace and comprises a modified naphthalene sulfonate) is added for every 100 pounds of cement. After about 24 hours of cure in appropriate molds, the PCC samples are taken out of the molds and immersed in water bath for 21 days for further cure. The PCC surfaces to be bonded are prepared by

TABLE I

Binder or Primer Properties Before and After Cure

| Primer or Binder Formulation | Before Cure | | | After Cure | | | | |
|---|---|---|---|---|---|---|---|---|
| | Pot-life (Min.) | Viscosity | Sp. gr. at 23° C. | Tg, °C. Midpoint | Immersion in Oil | | Immersion in Water | |
| | | | | | Max. wt. %[1] | Mass loss %[2] | Max. wt. %[1] | Mass loss %[2] |
| #1 | 42 | 120 | 1.08 | 57 | <0.03 | 0.20 | <0.15 | 0.24 |
| #2 | 48 | 20 | 1.06 | — | — | — | — | — |
| #3 | 35 | 210 | 1.03 | 85 | <0.01 | 0.13 | <0.12 | 0.15 |
| #4 | 43 | 430 | 1.03 | — | <0.01 | 0.05 | <0.11 | 0.14 |

1: Max. absorption during 20 cycles of intermittent immersion.
2: Mass loss after 20 cycles of intermittent immersion.

cutting with a water-cooled diamond blade saw. Dry PCC samples are prepared by placing them in an oven at about 110° C. for about 48 hours and cooled to room temperature before using. Moist PCC samples are prepared by immersing them in water for 48 hours followed by blot-drying with paper towels immediately prior to use.

Tensile specimens are prepared using ASTM 192–81 (American Standard Testing Method). To test for bond strength, half of the mold is filled with a previously primed PCC substrate, and the rest of the mold is filled with PC slurry. Flexural specimens (to test the strength for flexing) are prepared using 1"×1"×12" molds. The testing device is analogous to one utilized by Caltrans and titled "California Test 551" (Published by Division of New Technology, Materials and Research, Calif. Department of Transportation, 5900 Folsom Blvd., Sacramento, Calif. 95819), except the scale is reduced by one-third.

binder premix of this invention (see Tables III and IV). Samples are subjected to 20 rigorous freeze-thaw cycles. Each cycle consists of heating for about 24 hours at about 57° C., followed by immersing in water at room temperature for about 24 hours, and followed by freezing at about −20° C. PC Type D of this invention shows no flexural interfacial bond failure even after the rigorous freeze-thaw cycles (see Table III).

TABLE II

Effect of Binders and Primers on Mechanical and Bonding Properties of PC

| | PC Bond Type | Formulation Binder Premix/Primer | Tensil Properties[1] psi | FM, % IF[2] | Flexural Properties[1] psi | FM, % IF[2] |
|---|---|---|---|---|---|---|
| | PCC Only | — | 600 | — | 300 | — |
| A | PC only | #1/— | 940 | — | 650 | — |
| | PC/PCC (dry) | #1/#1 | 600 | 20 | 290 | 20 |
| | PC/PCC (moist) | #1/#1 | 200 | 95 | 160 | 95 |
| | PC/Steel | #1/#1 | 1060 | 75 | 400 | 50 |
| | PC/Al | #1/#1 | 1040 | 35 | 370 | 50 |
| B | PC Only | #1/— | 940 | — | 650 | — |
| | PC/PCC (dry) | #1/#2 | 600 | 0 | 280 | 0 |
| | PC/PCC (moist) | #1/#2 | 380 | 95 | 180 | 40 |
| | PC/Al | #1/#2 | 650 | 100 | 340 | 70 |
| C | PC Only | #1/— | 940 | — | 650 | — |
| | PC/PCC (dry) | #1/#3 | 610 | 0 | 320 | 0 |
| | PC/PCC (moist) | #1/#3 | 420 | 10 | 270 | 20 |
| D | PC Only | #3/— | 1870 | — | 960 | — |
| | PC/PCC (dry) | #3/#3 | 680 | 0 | 290 | 0 |
| | PC/PCC (moist) | #3/#3 | 600 | 0 | 280 | 0 |
| | PC/Steel | #3/#3 | 1760 | 0 | 980 | 0 |
| | PC/Al | #3/#3 | 1920 | 0 | 880 | 0 |
| E | PC Only | #4/— | — | — | 1020 | — |
| | PC/PCC (dry) | #4/#4 | 580 | 0 | 290 | 5 |
| | PC/PCC (moist) | #4/#4 | 440 | 15 | 270 | 0 |
| | PC/Steel | #4/#4 | 1680 | 0 | 900 | 10 |
| | PC/Al | #4/#4 | 780 | 40 | 910 | 10 |

1: Sample sizes: 1" × 1" cross-section.
2: FM, % IF: % Interfacial failure: The rest is cohesive failure.

It is clearly demonstrated that the subject composition, Formulation #3, is superior primer for moist PCC and metal substrates, and furthermore, is a superior binder for PC for repair work. Table II shows results of PC with Aristech's unsaturated polyester binder premix, Formulation #1, cast on to substrates after priming with primers with different formulations, Formulations #1, #2, and #3. PC Bond Type C which uses primer of this invention, Formulation #3, gives superior bond properties to PC Bond Types A and B. In other words, primer of this invention minimizes interfacial failure of PC/PCC (moist) even when Aristech's unsaturated polyester PC is used. PC Type D which utilizes Formulation #3 for both primer and binder premix for PC, have the best tensile, flexural, and impact strengths (see Tables II and IV). Furthermore, all the failures of PC Bond Type D are cohesive failures of weaker materials, and no interfacial bond failure is observed.

Result of rigorous cycling of PC Types A, D and E again demonstrates superior bond characteristics of primer and

TABLE III

Effect of Freeze-Thaw Cycles on Flexural Test

| | Flexural Properties After Zero Freeze-Thaw Cycles | | Flexural Properties After 20 Freeze-Thaw Cycles | |
|---|---|---|---|---|
| PC Bond Type | psi | FM, % IF | psi | FM, % IF |
| A  PC Only | 650 | — | 400 | — |
| PC/PCC(dry) | 290 | 20 | 120 | 90 |
| PC/PCC(moist) | 160 | 95 | 30 | 100 |
| D  PC Only | 960 | — | 800 | — |
| PC/PCC(dry) | 290 | 0 | 170 | 0 |
| PC/PCC(moist) | 280 | 0 | 180 | 0 |
| E  PC Only | 1020 | — | 850 | — |
| PC/PCC(dry) | 290 | 0 | 170 | 90 |
| PC/PCC(moist) | 270 | 0 | 280 | 30 |

TABLE IV

Effect of Freeze-Thaw Cycles on Impact Test

| PC Bond Type | | Impact Properties After Zero Freeze-Thaw Cycles | | Impact Properties After 20 Freeze-Thaw Cycles | | Impact Properties After Oil Immersion Cycles | |
|---|---|---|---|---|---|---|---|
| | | # of drops[1] | Delamination %[2] | # of drops[1] | Delamination %[2] | # of drops[1] | Delamination %[2] |
| A | PC Only | 2–3 | — | 2—2 | — | 3—3 | — |
| | PC/PCC (dry) | 1–2 | 0 | 1—1 | 10 | 2—2 | 0 |
| | PC/PCC (moist) | 1–2 | 0 | 1—1 | 30 | 1–2 | 0 |
| D | PC Only | 4–5 | — | 4–7 | — | 4–6 | — |
| | PC/PCC (dry) | 2—2 | 0 | 1–2 | 0 | 2–3 | 0 |
| | PC/PCC (moist) | 2–3 | 0 | 1–2 | 0 | 2–3 | 0 |
| E | PC Only | 2–6 | — | 2–3 | — | 2–3 | — |
| | PC/PCC (dry) | 1–3 | 0 | 1–3 | 0 | 1–3 | 0 |
| | PC/PCC (moist) | 3–4 | 0 | 1–2 | 0 | 1–2 | 0 |

1: # of drops needed for failure, range of the # of drops of three samples.
2: Degree of delamination when the bond samples are fragmented.

Specifically, Table IV shows effects of 20 freeze-thaw cycles and intermittent oil immersion cycles on impact properties. PC samples are prepared by casting the PC slurry to about the 60 mL mark of a 100 mL polyethylene beaker (about 1.3" high). PC/PCC bonded samples are prepared as follows: PCC samples are prepared using 100 mL polyethylene beaker. Cured PCC samples are sawed at the 70 mL line (PCC height of 1.5"). Sawed samples are placed into a beaker mold and PC slurry is cast up to the 100 mL mark and cured (PC height of about 0.5" over 1.5" of PCC). For the impact strength test the sample is placed with the smaller diameter end resting on a rigid steel plate, and a 1242 g steel weight with a hemispherical bottom is dropped repeatedly from a height of 5'9" until the sample is fragmented. Each cycle of oil immersion consists of heating the sample at about 57° C. for 24 hours followed by immersion in engine oil for 24 hours at room temperature. Again, PC Type D of this invention shows no deterioration of impact properties of PC after 20 cycles of intermittent oil immersion or freeze-thaw cycles. Furthermore, no delamination is observed when the samples are completely fragmented. A slight weakening of bonded PC/PCC samples (slightly less number of drops needed for failure) after 20 freeze-thaw cycles is mostly likely due to deterioration of PCC.

PC Type D of this invention is again compared with PC Type A using California Test 551, which is the current evaluation test for overlay materials for rehabilitation of bridges and highways (see Table V).

TABLE V

Effect of Binder on Mechanical and Bond Properties of PC

| PC Bond Type | | Compressive Test (3" × 3" × 3") | | Bond Strength (Flexural)[3] | |
|---|---|---|---|---|---|
| | | Strength, psi | Relative Strain Energy[2] | Failure psi | Mode, % IF |
| Ref. | PCC[1] | 9,800 | 1.0 | 850 | — |
| A | PC Only | 7,100 | 1.9 | 1,830 | — |
| | PC/PCC (dry) | — | — | 1,030 | 15 |
| | PC/PCC (moist) | — | — | 640 | 90 |
| D | PC Only | 11,200 | 2.5 | 2,680 | — |
| | PC/PCC (dry) | — | — | 890 | 0 |
| | PC/PCC (moist) | — | — | 940 | 0 |

[1]PCC Formulation: Type II cement 17.5%; Tperkins PC 30%; Lonestar pea gravel (B39) 45%; Water 7.5%; and Superplastisizer 1%.
[2]Area under the stress-strain curve to failure.
[3]California Test 551, California Department of Transportation (1988).

PC type D gives higher compressive and flexural strengths, greater strain energy, and gives excellent bond properties. Greater strain energy of PC Type D (which measures toughness) is consistent with the greater impact strength of PC Type D as demonstrated in Table IV. Excellent bond strength of PC Type D to even moist PCC, with no interfacial failure, is again consistent with the results shown in Table II.

The invention has now been explained with reference to specific embodiments. Other embodiments will be suggested to those of ordinary skill in the appropriate art upon review of the present specification.

Although the foregoing invention has been described in some detail by way of illustration and example for purposes of clarity of understanding, it will be obvious that certain changes and modifications may be practiced within the scope of the appended claims.

What is claimed is:

1. A primer or binder premix composition that is polymerizable into a polymeric concrete, comprising a mixture of:

a) a vinyl ester having characteristic, —COO—CH$_2$—CHOH—CH$_2$O—, linkages in an amount between about 10 to about 90 weight % that polymerizes upon promotion by an initiator and cures in a temperature range of between about 4° C. and about 60° C.;

b) styrene in an amount between about 10 to about 70 weight %; and c. hydroxyethylmethacrylate in an amount between about 0.1 and about 60 weight %.

2. A primer or binder premix composition that is polymerizable into a polymeric concrete, comprising a mixture of:

a) a vinyl ester having characteristic, —COO—CH$_2$CHOH—CH$_2$O—, linkages in an amount between about 10 to about 90 weight % that polymerizes upon promotion by an initiator and cures in a temperature range of between about 4° C. and about 60° C.;

b) styrene in an amount between about 10 to about 70 weight %;

c) hydroxyethylmethacrylate in an amount between about 0.1 and about 60 weight %; and d) both a silane coupling agent and a flexiblizing agent.

* * * * *